Feb. 17, 1959  H. E. HELM  2,873,832
DRIVE SHAFT LOCK SYSTEM
Filed Nov. 9, 1956
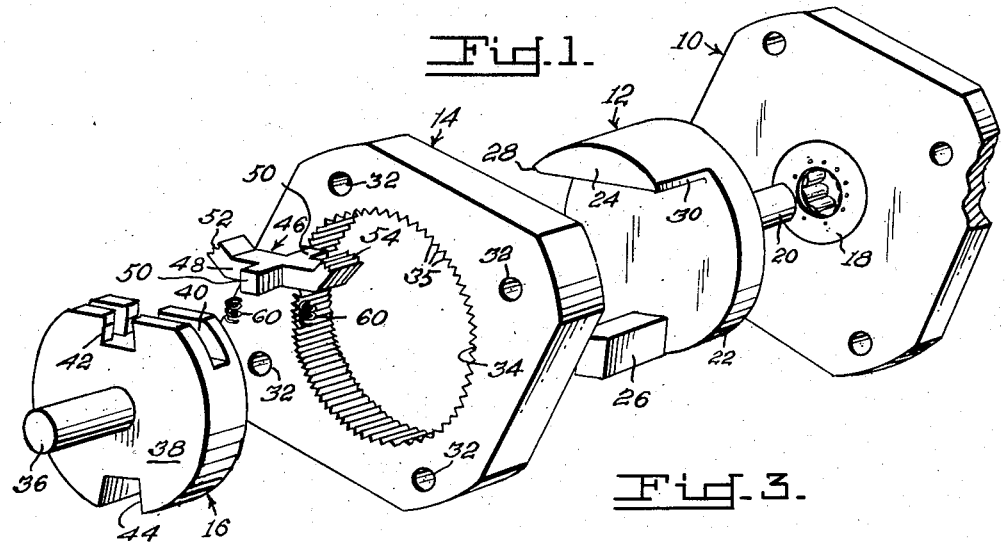
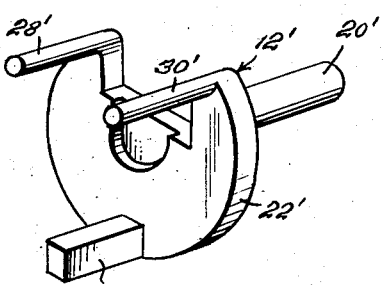
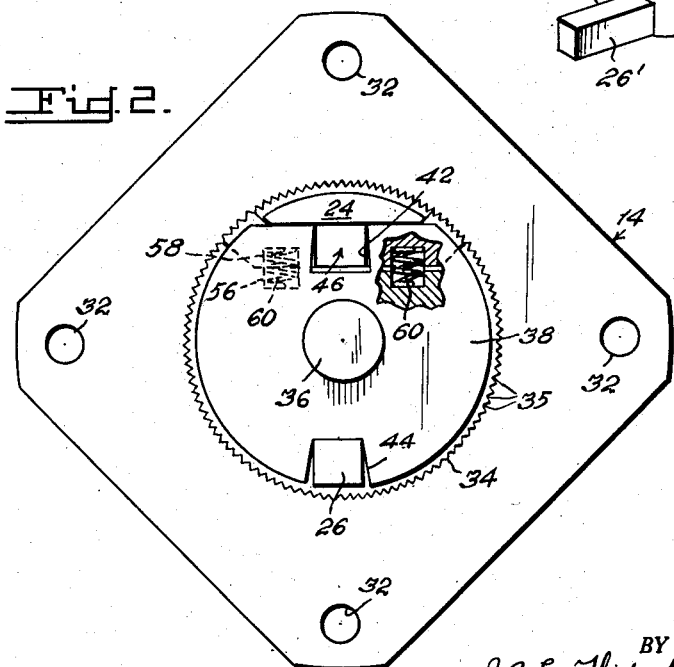
INVENTOR.
Homer E. Helm
BY
W. E. Thibodeau  A. W. Pew
and  R. M. Lyon

United States Patent Office 2,873,832
Patented Feb. 17, 1959

2,873,832
DRIVE SHAFT LOCK SYSTEM
Homer E. Helm, Birmingham, Mich.
Application November 9, 1956, Serial No. 621,484
1 Claim. (Cl. 192—8)
(Granted under Title 35, U. S. Code (1952), sec. 266)

The invention described in the attached specification and claim may be manufactured and used by or for the Government for governmental purposes without the payment to me of any royalty thereon.

The invention relates to a drive shaft system, more particularly relating to a lock for a drive shaft system.

It is often desired in drive systems to provide means for locking the drive shaft during the time when power is not being applied to the shaft, and the invention relates to mechanism for locking a drive shaft in a positive lock position during this inactive period. With devices of this nature it is desired to maintain the locked shaft, such that rotation in either direction is prevented with a minimum of "play." Applicant's invention contemplates structure which gives a positive lock with very small rotative movements necessary to engage the lock.

It is an object of the invention to produce a drive lock system which will lock the driven element from rotative movement in either direction.

It is a further object of the invention to design a drive lock system, whereby rotation of the driving member in either direction will automatically unlock the driven member and impart rotation thereto.

Another object of the invention is to produce a drive lock system wherein inverse loading does not cause an increase in the effort required to unlock the device.

A yet further object of the invention is to produce a drive lock system of light weight and simple construction, which will be economical to produce and easy to maintain.

Fig. 1 is an exploded view of the drive lock system.
Fig. 2 is an end view of the assembled lock system.
Fig. 3 discloses a modified form of driving member.

In the disclosed embodiment the drive lock system comprises basically of a bearing block 10, a driving member 12, a stationary ring 14, and a driven member 16. The bearing block 10 is fixed to a housing, casing, or such as would be used to encase the system and contains an anti-friction means 18, usually of the ball or roller bearing type.

Driving member 12 is comprised of a shaft 20 which is rotatably supported in anti-friction means 18. An enlarged collar 22 is formed on the end of shaft 20 for rotation therewith, a pawl engaging projection 24, and a drive projection 26 are formed on collar 22 and extend axially therefrom. The pawl engaging projection 24 is provided with engaging surfaces 28 and 30.

Ring 14 is fixed to bearing block 10 by means of bolts or such extending through holes 32. Ring 14 is constructed with a bore 34 in which are formed a multiplicity of serrations 35. As the engaging motion of the lock system is dependent on the distance of the serrations from each other, it is contemplated to place the serrations at very close intervals to keep the engaging motion to a minimum degree of rotation.

The driven member 16 consists of a shaft 36 which is rotatably supported in a bearing block (not shown) similar to bearing block 10. An enlarged collar 38 is attached to shaft 36 and formed within the periphery of this collar are intersecting slots 40 and 42. A third slot 44 is positioned in collar 38 diametrically opposite from the slots 40 and 42.

A pawl 46 is shaped to fit within slots 40 and 42 and consists of a main body portion 48 and ears 50 which extend from the center of body 48. The ends of body 48 are bent upwardly and formed with serrations 52 and 54. Aligned recesses 56 and 58 are formed within collar 38 and pawl 46 respectively in which springs 60 are placed.

The device is assembled in the following manner:

Shaft 20 is placed within bearing 18 and is connected to a power source, ring 14 is fixed to bearing block 10 which will position collar 22 within bore 34 of ring 14. Springs 60 are placed in recesses 56 and pawl 46 is fitted within slot 40, ears 50 lying in slot 42, the clearance of ears 50 and slot 42 permits the pawl 46 to pivot slightly and also move radially, springs 60 will thereupon engage recesses 58 of the pawl 46. The assembled collar 38 and pawl 46 fits within bore 34, such that pawl engaging projection 24 is superpositioned above pawl 46 and drive projection 26 inserts within slot 44. Shaft 36 will be supported by a bearing block and connected to the driven means.

The operation is as follows:

While no motion is imparted to the driving member 12, any rotative or torque forces applied to shaft 36 and driven member 16 will be prevented by pawl 46 as springs 60 will force the serrated portions 52 and 54 of the pawl 46 into engagement with the serrations of stationary ring 14, thereby preventing rotation of shaft 36 in either direction. As the serrations of the bore and pawl are fine, the locking action will take place with a very small rotation of shaft 36, and the serrations will give a positive locking action. When a torque is applied to the driving member, in a clockwise direction as viewed in Fig. 1, for instance, the engaging surface 30 will press on the pawl and disengage serrations 54, thereby permitting driven member 16 to be rotated by drive projection 26 and slot 44. Serrations 52 will then merely trail around the serrated bore 34. If a counter-clockwise rotation is imparted to driving member 12 (Fig. 1), engaging surface 28 will cause the pawl 46 to be rocked counter-clockwise, disengaging serrations 52 and rotating driven member 16 in a counter-clockwise direction. As the ends of the pawl body portions 48 are tilted upwardly, the ends of the pawl are normal to the serrated bore 34 facilitating a positive locking action when the system is at rest.

Only a small effort is required to turn the device as the force exerted by springs 60 need only be sufficient to hold the weight of the pawl 46 against low level vibrations. A modification of the driving member is shown in Fig. 3 where driving member 12' comprises a shaft 20', a collar 22' from which extend projections 26', 28' and 30'. This driving member 12' is positioned relative to driven member 16 and functions in the same manner as driving member 12, projections 28' and 30' operate the pawl, and projection 26' imparts the driving forces. The modification is of a lighter weight and may be used where the torque requirements are not as large as those of the first disclosed embodiment.

It is thus seen that herein is disclosed a drive lock system which prevents the driven member from rotation in either direction, engages quickly, yet is automatically disengaged upon power being applied to the driving member irrespective of the direction of rotation of the driving member. The construction is simple and economical to manufacture and is readily adapted to a multitude of applications.

I claim:

A drive lock system comprising a fixed ring member having a serrated bore; a driving member in said bore, a first projection and a second projection extending axially from said driving member; a driven member within said bore, a first axial slot in said driven member, said second projection extending into said first slot so that rotation of said driving member will rotate said driven member, a second axial slot in said driven member diametrically positioned from said first slot, a third slot in said driven member perpendicular to and communicating with said second slot, a double ended pawl lying in said third slot, projections on said pawl pivotally lying in said second slot, each end of said pawl having serrations and being tilted normal to said bore, two springs in said driven member normally urging said serrated ends of said pawl to engage said serrated bore when said driving member is at rest thereby locking said driven member in said bore; said first projection of said driving member lying superposed above said pawl whereby rotation of said driving member causes said first projection to contact one end of said pawl thereby pivoting said pawl in said second slot so as to disengage one serrated end of said pawl from said serrated bore and thereby permit said driven member to rotate in the direction of said disengaged end of said pawl.

References Cited in the file of this patent

UNITED STATES PATENTS

| | | |
|---|---|---|
| 414,665 | Wilcox et al. | Nov. 5, 1889 |
| 996,142 | Rittenhouse | June 27, 1911 |
| 1,083,399 | Hangar | Jan. 6, 1914 |
| 1,718,426 | Hokanson et al. | June 25, 1929 |